United States Patent [19]

Koskinen et al.

[11] Patent Number: 5,468,698
[45] Date of Patent: Nov. 21, 1995

[54] METHOD FOR THE PREPARATION OF A PARTICULATE CARRIER FOR A POLYMERIZATION CATALYST

[75] Inventors: Jukka Koskinen, Espoo; Thomas Garoff, Helsinki, both of Finland

[73] Assignee: Borealis Holding A/S, Lyngby, Denmark

[21] Appl. No.: 240,732

[22] PCT Filed: Nov. 27, 1992

[86] PCT No.: PCT/FI92/00324

§ 371 Date: May 11, 1994

§ 102(e) Date: May 11, 1994

[87] PCT Pub. No.: WO93/11166

PCT Pub. Date: Jan. 10, 1993

[30] Foreign Application Priority Data

Nov. 29, 1991 [FI] Finland ..................... 915632

[51] Int. Cl.⁶ ............... B01J 35/08; B01J 37/00
[52] U.S. Cl. ............... 502/9; 502/107; 502/111; 502/125; 502/134
[58] Field of Search ............... 502/9, 107, 111, 502/125, 134

[56] References Cited

U.S. PATENT DOCUMENTS

| | | | |
|---|---|---|---|
| 4,071,674 | 1/1978 | Kashiwa et al. | 526/125 |
| 4,421,674 | 12/1983 | Invernizzi et al. | 502/154 |
| 4,829,034 | 5/1989 | Iiskolan et al. | 302/9 |
| 4,843,049 | 6/1989 | Invernizzi et al. | 502/9 |
| 5,100,849 | 3/1992 | Miya et al. | 502/9 |
| 5,204,303 | 4/1993 | Korvenoja et al. | 502/9 |

FOREIGN PATENT DOCUMENTS

| | | |
|---|---|---|
| 0065700 | 12/1982 | European Pat. Off. |
| 59-215301 | 12/1984 | Japan . |

Primary Examiner—Asok Pal
Assistant Examiner—Timothy H. Meeks
Attorney, Agent, or Firm—Birch, Stewart, Kolasch & Birch

[57] ABSTRACT

The invention relates to a method for preparing a particulate carrier for an olefin polymerization procatalyst comprising a complex of an organic compound/transition metal compound as a carrier. In the method a melt $MgCl_2$—$C_2H_5OH$-complex is provided containing on average 3.3 to 5.5 $C_2H_5OH$-molecules per each $MgCl_2$-molecule, the melt $MgCl_2$-complex is sprayed through a nozzle dispersing it into a chamber, wherein a particulate carrier is formed of it and the particulate carrier is removed from the chamber. Unlike prior known methods to produce a carrier having an optimal $C_2H_5OH$ content in this invention the removal rate—by the aid of heat—of $C_2H_5OH$ from the $MgCl_2$—$C_2H_5OH$-complex in connection with the spraying that the particulate carrier is controlled. As a result, the particulate carrier obtained possesses on average 2.0 to 3.2 $C_2H_5OH$ molecules per each $MgCl_2$ molecule. Such a carrier has a suitable $C_2H_5OH$ content and a good morphology and spraying it does not raise any difficulties.

16 Claims, 3 Drawing Sheets

METHOD FOR THE PREPARATION OF A PARTICULATE CARRIER FOR A POLYMERIZATION CATALYST

FIELD OF THE INVENTION

The invention relates to a method for preparing a particulate carrier for an olefin polymerization procatalyst comprising a complex of an organic compound/transition metal compound as a carrier, in which method a) providing a melt of a $MgCl_2$—$CH_5OH$-complex containing on average 3.3 to 5.0 $C_2H_5OH$-molecules per each $MgCl_2$-molecule, b) spraying the melt $MgCl_2$-complex through a nozzle and dispersing it into a chamber, wherein a particulate carrier is formed of it, and c) removing carrier from the chamber.

BACKGROUND OF THE INVENTION

For the polymerization of olefins the Ziegler-Natta-catalyst system is generally used, which consists of a so-called procatalyst and a cocatalyst. The procatalyst is based on a compound of a transition metal belonging to any of the groups IV(A) to VIII(A) (Hubbard) of the periodical system of elements and the cocatalyst is based on an organometallic compound of a metal belonging to any of the groups I (A) to III (A) (Hubbard) of the periodical system of elements.

Nowadays, the procatalysts typically comprise an inert carrier, on which the actual active catalyst component i.e. the transition metal compound or the mixture of the complex formed by the catalytical compounds has been layered. The morphology and size distribution of the particles of such a carrier are most significant for the activity of the catalyst and the properties of the polymer obtained through the catalyst. With an active catalyst you are, namely, able to produce a polymer, from which, due to its purity, no catalyst residues need to be removed. The morphology of the carrier, again, influences the morphology of the polymer product itself for it has been noticed that the morphology of the catalyst is repeated in the structure of the polymer (the so-called replica phenomenon). When a flowing product polymer having the desired morphology and a narrow particular size distribution is wanted, which is desirable in view of the many aims of use of the processing processes, the properties of the carrier shall by the aid of the replica phenomenon be made similar.

Nowadays, the Ziegler-Natta type procatalysts typically comprise a magnesium based carrier, such as magnesium chloride, which has been treated with a transition metal compound of titanium halide, such as titanium tetrachloride, and sometimes also with an electron donor compound. It is also known that the carrier can be brought to an advantageous and equal-size crystal form by letting it crystallize as a complex from any of its crystal solvents.

The treatment of such a carrier with a crystal solvent has been disclosed among others in the U.S. Pat. No. 4,071,674, in which the procatalyst based on a transition metal compound has been prepared by bringing a titanium or vanadium compound to react with a reaction product that has been formed when magnesium dihalide and the addition product of alcohol are reacting with an organometallic compound of a metal of any of the groups I–III. The preparation of the procatalyst begins with the addition of alcohol dropwise to the suspension of magnesium dihalide, after which the organometallic compound is added dropwise to the reaction mixture. After agitation the preactivated carrier is activated by adding titanium tetrachloride to the mixture. The adding stages of this kind of a method are primitive and do not at all allow regulation of the morphology of the procatalyst in the way desired.

Treatment with a crystal solvent has also been described in patent application JP-59-215301. In this publication the carrier complex (10 g of $MgCl_2$ and 24.2 g of EtOH) have been prepared by an emulsifying technique. The carrier complex melt has been dispersed into n-decane as spheroidal melt particles. Thereafter the carrier particles in the emulsion have been shock coagulated by transferring the emulsion into cold hydrocarbon medium. A drawback of this method is, among others, that such components are needed in the preparation of the carrier that are not useful at later stages of the catalyst preparation and this presupposes the existance of a purifying and recirculation equipment for this purpose.

The patent family comprising, among others, the EP publication 65700 and the U.S. Pat. No. 4,421,674 which claims priority from the Italian application IT 2,188,181 (810521), deal with a method for the preparation of a catalyst, which is particularly active in the polymerization of gaseous ethylene.

In the process titanium halide is brought to react with a magnesium chloride catalyst carrier being in the form of microballs, after which the reaction product particles are recovered by physical means and are mixed together with an organometallic cocatalyst product.

Characterizing of this method representing the prior art is that:

a) a solution is provided which contains essentially magnesium dichloride dissolved in ethanol, the concentration of which is between 100 to 300 g of magnesium dichloride/l of solution, whereby the aqueous content of the solution does not exceed 5% by weight, b) a spray-drying of the solution is carried out by spraying it to a flow of essentially non-aqueous nitrogen gas, the purity of which is at least 99.9% and the inflow temperature of which flow is between 180° to 280° C., whereby the flow and nitrogen and the solution are simultaneously controlled so that the outflow temperature is between 130° to 210° C., provided the outflow temperature mentioned is at least 40° C. lower than the inflow temperature and ethanol does not evaporate completely, whereby spheroidal magnesium chloride particles are obtained, c) the magnesium dichloride particles are brought to react with titanium halide, which is in vaporous or liquid form and is possibly diluted with an inert evaporizable solvent, d) the reaction product particles are recovered by physical means, when they contain 0.7 to 12% by weight of titanium bound in solid material and e) the reaction product particles mentioned are mixed with the organometallic compound, which is either alkyl aluminum or alkyl aluminum halide.

According to FI patent publication 80055 (Neste Oy) the above-mentioned carrier complex formed by the carrier and the crystal solvent can be melted to clear liquid. When this kind of a liquid is conducted through the spray nozzle to the spray space cooled with cold nitrogen gas it crystallizes to spheroidal small particles of the carrier complex which are very flowable and loose. The process took in practice place so that $MgCl_2$ and $C_2H_5OH$ were melted at the temperature 110° to 130° C. to a clear melt. Then the clear homogenized mixture was fed through a nozzle dispersing it into a cooled spray chamber. The spraying gas used in the spraying was dry nitrogen having the temperature +130° C. and as cooling medium dry nitrogen was conducted to the spraying chamber, the temperature of which was 20° C. As the nozzle a gas fluidizing nozzle was used.

This kind of a method produces very flowable and loose particles. Moreover, the carrier complex crystallizes without any evaporation of the crystal solvent. When such a carrier is brought into contact with titanium compound, abundantly for catalytically active complexes between $MgCl_2$ and the titanium compound are formed on the surface of the carrier when the crystal solvent leaves.

Accordingly, two methods of preparation based on the spraying are prior known in the field. The spray drying method patents are based on a fairly complete drying of the carrier liquid from ethanol ($C_2H_5OH$) after the spraying. Hereby, the carrier has usually been dried at a temperature exceeding 150° C., whereby a major portion of the alcohol of the complex is evaporated. In the spray-drying method a carrier product is typically obtained, the alcohol concentration of which is between 15 to 25% by weight and anyway below 30% by weight.

One central drawback of spray-drying is the bad morphology of the carrier obtained and the wide particle size distribution, which is caused by the breaking of the particles during the process. In FIGS. 1 and 2 an electron microscope picture of the carrier is presented. The close-up picture of FIG. 2 shows that the spheroidal particles are either compressed or then they have been broken into crust fragments of the hollow ball. On the basis of the physical process and the particles created in it, it can be supposed that the removal of $C_2H_5OH$ at temperatures exceeding +150° C. results in the formation of a gas state inside the particles, which then results in the disintegration of the spheroidal particles into crust fragments or their becoming compressed when the gas cools down in the hollow space. The spray-drying will, anyhow, result in a very poor carrier morphology.

It can thus be said that while the spraying steps of prior spray-drying methods were easy to carry out and their yield of produced carrier is good, the activity of the procatalyst obtained by activation with $TiCl_4$ when polymerizing PP (polypropylene) is only between 10 to 12 kg of PP/g of catalyst and the morphology of the polymer obtained by it is very poor producing even up to 60 to 70% by weight of finely-divided material (d<1 mm), the bulk density being of the order of about 0.2 g/ml. The above-mentioned activity of the procatalyst obtained by spray-drying is lower than that of the procatalysts obtained by other methods, which is due to the fact that in spray-drying the major portion of the $C_2H_5OH$ participating in the $TiCl_4$ activation leaves the carrier before it is reacted with $TiCl_4$.

The spray-crystallization of such a melt $MgCl_2$—$C_2H_5OH$ complex that contains on average 3.5 or more $C_2H_5OH$ molecules as per each $MgCl_2$ molecule is easy and gives a relatively good yield, whereby the result is a procatalyst having a good activity i.e. of the order of about 15 kg of PP/g of catalyst. It has, however, been noticed that the $C_2H_5OH$ amount of the carrier is the same as the respective amount of the melt and too high causing during the $TiCl_4$ activation heavy formation of HCl gas, which breaks the procatalyst particles and results in a poor procatalyst morphology and a poor particle size distribution. In the polymerization polypropylene having a poor morphology and about 25 to 55% by weight of finely-divided substance (d<1 mm) is obtained. The bulk density of the polymer obtained is 0.40 to 0.44 g/ml.

In the spray-crystallization of melt $MgCl_2$—$C_2H_5OH$ complex which contains less i.e. in the average about 2.9 molecules of $C_2H_5OH$ as per each $MgCl_2$ molecule, big difficulties are again encountered when spraying melt into the crystallization chamber. Melt with little alcohol apparently is too viscous and causes clogging of the nozzle and formation of too big particles e.g. as a result of solidification. The carrier yield is very low remaining below 10% in the polymerization of propylene a good activity of the procatalyst is obtained i.e. about 15 kg of PP/g of catalyst, but the morphology of the polypropylene is poor and it contains 20 to 40% of finely-divided material (d<1 mm), the bulk density being between 0.40 to 0.44.

Accordingly, it seems that the spray-crystallization results in a procatalyst whose activity is medium, and whose polymer products contain a very great portion of finely-divided material and possess a polymer morphology which is poor.

SUMMARY OF THE INVENTION

The aim of the present invention is to provide a new method for preparing a particulate carrier for olefin polymerization, which is easily sprayable and which gives a fairly good yield of material having a good morphology. The activity of the procatalyst must be as great as possible and the olefin polymerized by it must have a good morphology and a possibly small portion of finely-divided material. Moreover, the other properties of the polymer, such as the bult density and the melt index, must be satisfactory.

The above-mentioned aims have now been reached by a new kind of method for preparing a carrier for an olefin polymerization catalyst, which is principally characterized by what is mentioned in the characterizing clause of claim 1. It has thus been realized that a particulate carrier containing a suitable amount of $C_2H_5OH$ is without difficulties obtained by a method in which a) a melt $MgCl_2$—$CH_5OH$-complex is provided containing in the average 3.3 to 5.5 $C_2H_5OH$-molecules as per each $MgCl_2$-molecule, b) the melt $MgCl_2$-complex is sprayed through a nozzle dispersing it into a chamber, wherein a particulate carrier is formed of it, and c) the particulate carrier is removed from the chamber, so that during the stage b) so much $C_2H_5OH$ is removed from the $MgCl_2$—$CH_5OH$-complex by heat that the particulate procatalyst obtained will contain in the average 1.0 to 3.2 $C_2H_5OH$ molecules as per each $MgCl_2$ molecule.

DETAILED DESCRIPTION OF THE INVENTION

Figure 1:
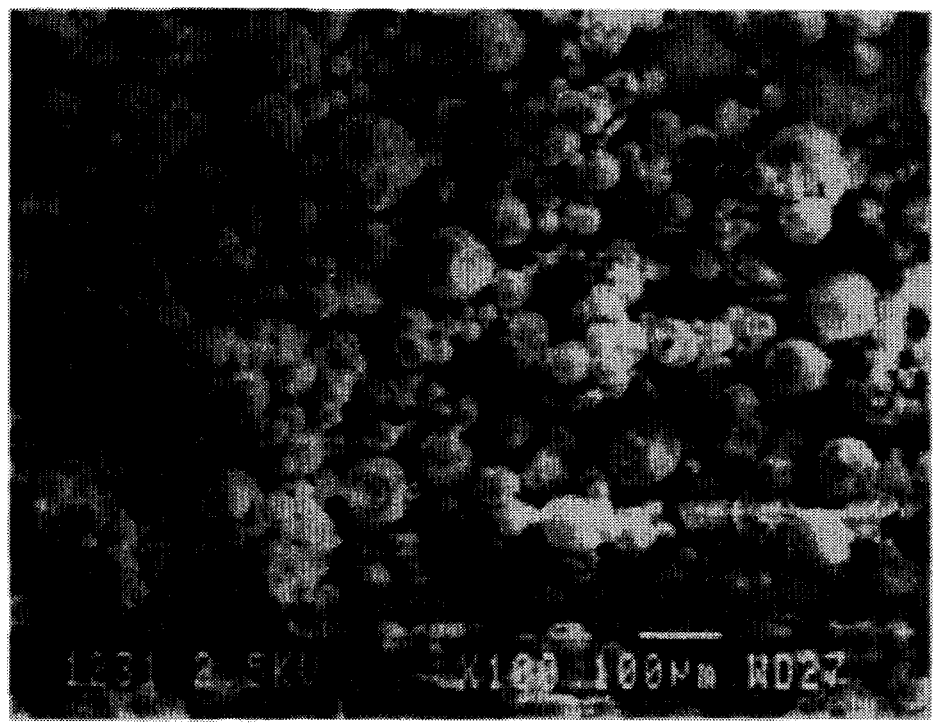
FIG. 1 Electron microscope picture of a Prior Art carrier.

Accordingly, the invention is based on the idea that the drawbacks of the spray-crystallization can be overcome by carrying out a controlled $C_2H_5OH$ removal stage for the mist of sprayed complex melt, which simultaneously allows an ideal melt viscosity in the spraying and an optimal $C_2H_5OH$ content in the particulate carrier product to be produced.

In the method according to the invention it is preferable to produce at stage a) a melt containing in the average 3.5 to 4.0 and particularly about 3.7 $C_2H_5OH$ molecules as per each $MgCl_2$ molecule.

According to one preferred embodiment of the invention the melt $MgCl_2$—$C_2H_5OH$ complex is sprayed into the upper portion of the chamber, where it is kept in a temperature removing $C_2H_5OH$ and is then conducted into the lower portion of the chamber, where it is cooled down in order to solidify the complex melt containing less $C_2H_5OH$ into a particulate carrier. The melt $MgCl_2$—$C_2H_5OH$ complex can hereby be maintained at a temperature removing $C_2H_5OH$ by spraying it into the upper portion of the chamber heated essentially above its melting point and/or by maintaining in the upper portion of the chamber a higher temperature than in the lower space of the chamber.

$C_2H_5OH$ is removed substantially when $MgCl_2$—$C_2H_5OH$ complex is sprayed into the upper portion of the chamber preferably heated to a temperature of about $+120°$ to $+250°$ C. and most preferably to a temperature of about $120°$ to $180°$ C. The use of this temperature range in the invention takes place so that the higher temperatures do not presuppose heating of the upper portion of the chamber but, when the higher temperatures are concerned, sooner cooling down of it, wheras the lower temperatures necessitate some kind of heating of the upper portion of the chamber for the removal of the $C_2H_5OH$ from the complex. The temperature of the melt complex is, of course, also dependent on the basic $C_2H_5OH$ content of the complex for the removal of greater amounts of $C_2H_5OH$ from the complex naturally necessitates more heat.

According to one preferred embodiment of the invention the temperature of $+20°$ to $+150°$ C., preferably the temperature $+30$ to $+80°$ C., dependent naturally on the composition of the complex and the temperature of the melt, is maintained in the upper portion of the chamber and in the lower portion of the chamber the temperature $-30°$ to $+40°$ C. is preferably maintained and most preferably the temperature $-20°$ to $+40°$ C., whereby the temperature of the lower portion is simultaneously kept lower than the temperature of the upper portion.

As the removal of $C_2H_5OH$ from the complex is dependent on both the feeding temperature of the complex melt and the temperature of the receiving upper portion of the chamber, the process can be characterized as the ratio of these temperatures so that it is advantageous to spray the $MgCl_2C_2H_5OH$ complex into the upper portion of the chamber heated to a temperature exceeding the melting point of the complex and being higher than ($+130°$ C. to the temperature of the upper portion of the chamber).

Inert nitrogen gas can, for example, be used for spraying melt and regulating the temperature of the chamber. The $MgCl_2$—$C_2H_5OH$ complex can, thus, be sprayed into the chamber by the aid of a hot nitrogen flow. The temperature of the nitrogen flow is typically $+130°$ to $+150°$ C. Also the temperatures of the upper and lower portions of the chamber can be maintained by the aid of one or several nitrogen flows. The removal of the nitrogen gas can be positioned in one place in the lower portion of the chamber or then both in the upper and the lower portion of the chamber.

The nozzle dispersing the melt $MgCl_2$—$C_2H_5OH$ complex can be any nozzle dispersing melt mass, e.g. a gas-liquid fluidisizing nozzle, an open or closed rotating nozzle or an ultrasound nozzle.

When the particulate carrier has been prepared, it is reacted with the transition metal compound and the optional electron donor to an olefin polymerizing procatalyst. It is preferable to react the carrier according to the present invention with $TiCl_4$ to produce an olefin polymerizing procatalyst. According to a furthermore preferable embodiment the carrier is reacted with $TiCl_4$ and an electron donor to produce an operating procatalyst.

EXAMPLE 1 to 4

Two 64 kg and two 80 kg portions of $MgCl_2$ were melted in a nitrified autoclave together with a corresponding amount of ethanol to produce a melt $MgCl_2.3,5C_2H_5OH$ complex. The clear homogeneous mixture was achieved after an agitation of several hours at a temperature of $+110°$ C. A chemical analysis was carried out for the complex melt, the results of which are presented in Table 1.

TABLE 1

| | Chemical composition of complex melt | | |
|---|---|---|---|
| Example | $MgCl_2$ (kg) | EtOH (l) | $EtOH/MgCl_2$ (mole/mole) |
| 1 | 64 | 137 | 3,5 |
| 2 | 80 | 171 | 3,5 |
| 3 | 80 | 171 | 3,5 |
| 4 | 64 | 137 | 3,5 |

Figure 3:
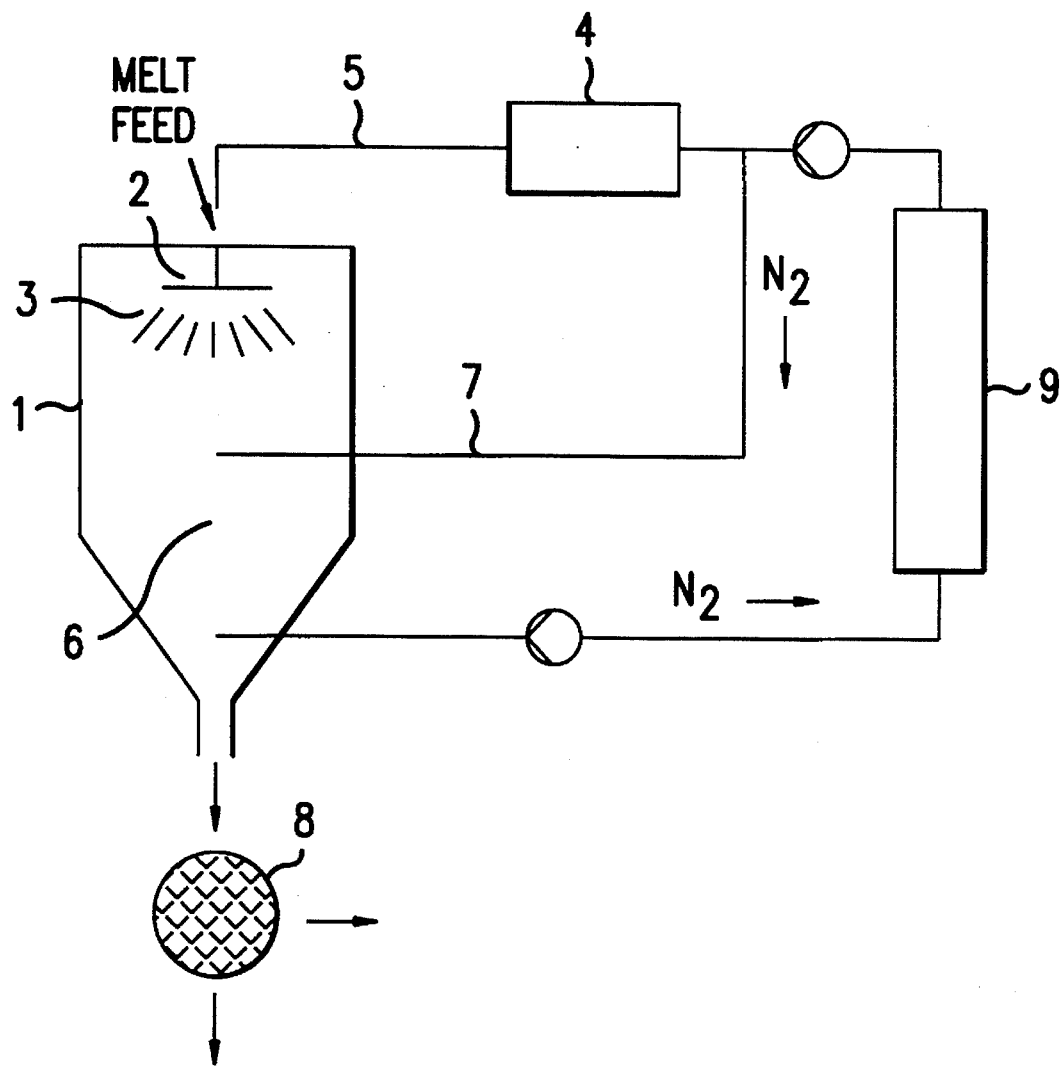
FIG. 3 Drawing of an equipment embodiment for carrying out the inventive method.

Then the clear homogenized mixture was heated from the temperature of $+10°$ C. to the temperature $+125°$ C. to achieve the $C_2H_5OH$ removal effect. The heated melt was thereafter fed in the manner shown in FIG. 3 to the closed rotation nozzle 2 of the chamber and from there further dispersed in small droplets to the upper portion 3 of the chamber 1. The head of the nozzle was a disc rotating at a rate of 24,000 rpm and the temperature of the upper portion of the chamber 1 was maintained at the temperature of $+40°$ C. by means of heated (heater 4) nitrogen gas 5 fed to the upper portion of the chamber and by means of cool nitrogen gas 7 fed to the middle and lower portion 6 of the cheer.

Thereafter the droplets, from which a part of the $C_2H_5OH$ had been removed, was conducted to the lower portion 6 of the chamber 1, where they solidified to carrier particles due to the temperature $+32°$ C. regulated by the same means. Finally, the carrier particles were conducted out from the chamber 1 and were sieved in sieve 8, the size of the openings of which were 200μm, so that the particles penetrating the sieve 8 were used for the preparation of the procatalyst. All the time warm nitrogen gas was removed from the chamber, which gas was cooled down by the cooler 9 for reuse.

The chemical composition of the carrier obtained after the spraying was measured by determining its $C_2H_5OH$, Mg, and water content. The results are presented in Table 2.

TABLE 2

| | Chemical composition of the carrier | | |
|---|---|---|---|
| Example | Mg | EtOH | $H_2O$ |
| 1 | 9.6 | 58.4 | 0.6 |
| 2 | 9.6 | 58.2 | 0.7 |
| 3 | 9.6 | 60.2 | 0.6 |
| 4 | 9.4 | 57.6 | 0.5 |

The Mg content of the carriers according to the examples were almost the same i.e. 9.4 to 9.6% by weight. The $C_2H_5OH$ content of three of the carriers was almost identic i.e. about 58% by weigh. The water content of all the carriers was about 0.6% by weight. As the very aim of the invention is a controlled removal of $C_2H_5OH$ during the spraying, the molar ratio $C_2H_5OH/MgCl_2$ was also determined from the carrier product. The molar ratio mentioned, in melt and in the carrier obtained, is presented in Table 3 and, moreover, the reduction in percentages of $C_2H_5OH$ taking place in the spraying is presented.

TABLE 3

Evaporation of $C_2H_5OH$ during the spraying

| Example | EtOH/MgCl$_2$ | EtOH/MgCl$_2$ | Vanish |
|---|---|---|---|
| 1 | 3.5 | 2.9 | 17.1 |
| 2 | 3.5 | 2.9 | 17.1 |
| 3 | 3.5 | 3.2 | 9.2 |
| 4 | 3.5 | 2.8 | 19.7 |

It turned out that in three of the cases (Examples 1, 2, and 4) the desired reduction of $C_2H_5OH$ had taken place and a carrier was obtained, the molar ratio EtOH/MgCl$_2$ of which was between 2.8 to 2.9. In the third example the evaporation was for some reason incomplete and a carrier was obtained, the molar ratio EtOH/MgCl$_2$ of which was 3.2. In this case only 9.2% of the ethanol had left the complex, whereas in the successful experiments the removal percentage was between 17 and 20%.

Also the particle size distribution of the sprayed carrier was determined. The results are presented in Table 4.

TABLE 4

Particle size distribution of the carrier

| Example | D(0.1) μm | D(0.5) μm | D(0.9) μm | Span |
|---|---|---|---|---|
| 1 | 29.4 | 94.8 | 354.5 | 3.43 |
| 2 | 23.9 | 100.5 | 295.2 | 2.70 |
| 3 | 10.3 | 45.4 | 135.3 | 2.76 |
| 4 | 40.0 | 113.5 | 272.4 | 2.05 |

Figure 2:
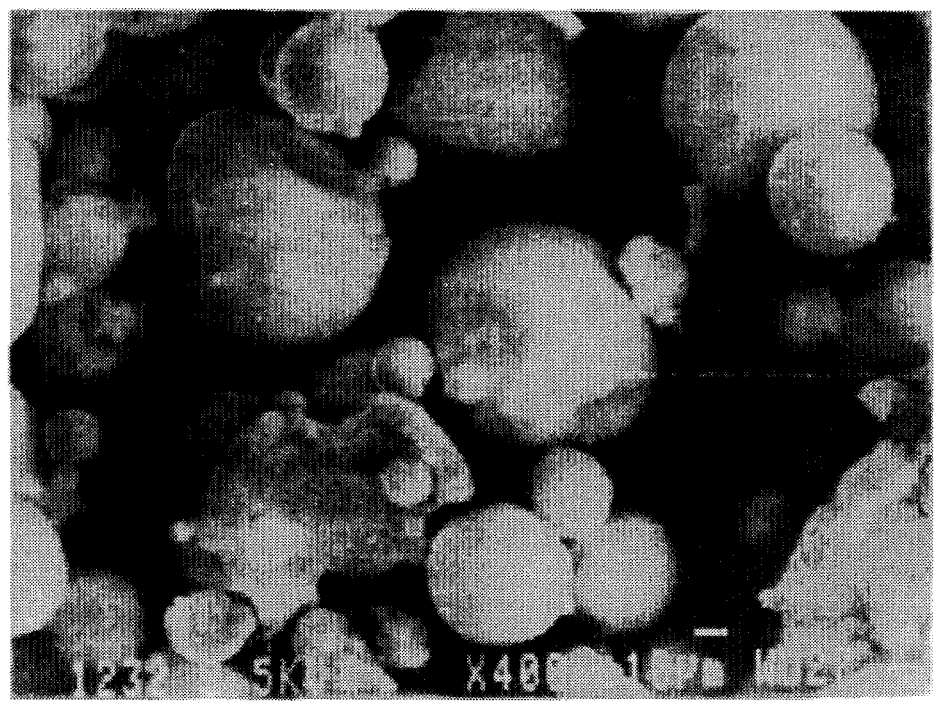
FIG. 2 Electron microscope picture of a Prior Art carrier.
Figure 4:
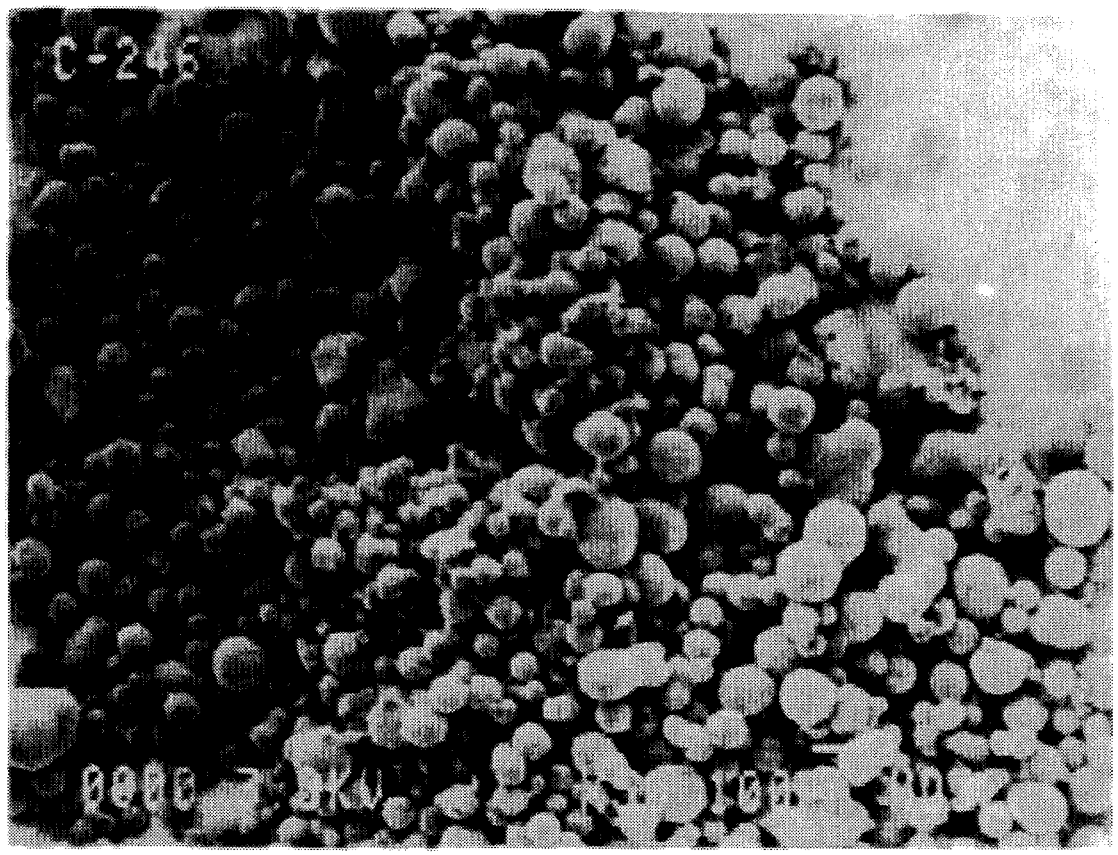
FIG. 4 Electron microscope picture of the carrier product of the invention.

As always, the particle size distribution curves show that in the synthesis a fraction of particles of great size was created, but these proved to be agglomerates that always occur in connection with the measuring of particle size distribution. In other respects the particle size distribution was fully satisfactory. In the same connection an electron microscope picture was taken of the carrier product. It is presented in FIG. 4. The picture is very representative of the excellent level of morphology reached by the method according to the invention. When FIGS. 4 and 2 are compared, it can be seen that the aims of the invention regarding the morphology have been reached.

Also an activation with TiCl$_4$ was carried out for the carriers and the copolymerization was carried out with the procatalysts thus obtained.

The activation was carried out so that a multioperation reactor furnished with a screen bottom, the volume of which was 1.5m$^3$, was cooled to the temperature of about −20° C. Thereafter, hydrocarbon solvent (the Neste product LIAV), carrier, and TiCl$_4$ were added to the reactor, in the order mentioned. The amount of carrier varied between 24 to 29 kg and the molar ratio TiCl$_4$/carrier $C_2H_5OH$ was about 10. The weight ratio LIAV/carrier was 9.0 and the molar ratio TiCl$_4$/carrier was about 30. The reactor was mixed and the temperature was slowly raised to +20° C. At this temperature di-isobutylene phthlate (DIPP) donor was added so that the molar ratio donor/Mg was 0.15. Then the temperature was raised to the value about 110° C. and was maintained there for an hour, after which the activation residues together with the TiCl$_4$ excesses were removed by rinsing through the screen bottom. The second treatment with TiCl$_4$ was carried out by adding the reagent to the purified solid intermediary product. The temperature was still 110° C. and the reaction time this time 2 hours. The molar ratio TiCl$_4$/Mg was also now 30. Finally, the product was washed and dried by a nitrogen gas flow.

The procatalysts obtained through a reaction between MgCl$_2$—$C_2H_5OH$ complex carrier and TiCl$_4$ were tested in the same polymerization conditions. A two-liter bank reactor was used. In each test polymerization run 20 to 30 mg of procatalyst was used. 620μl of triethylaluminium cocatalyst and 200μl of 25% heptane solution of cyclohexylmethyl methoxy silane donor was mixed to this amount. The medium was 30 ml of heptane. The polymerization was carried out at the temperature +70° C. and the propene monomer pressure of 10 bars. The partial pressure of hydrogen during the polymerization was 0.2 bars. The polymerization was continued for 3 hours. Thereafter the activity of the procatalyst was measured on the basis of the polymerization yield. The soluble portion of the polymer was measured by dissolving a determined polymer amount into the solvent and measuring the evaporation residue of the pure solution.

The bulk density and the particle size distribution of all the polymer samples was determined. The total amount of the finely-divided material was determined in connection with the particle size distribution measurings. Hereby, all polymer particles with a diameter less than 1 mm were defined as finely-divided material.

The titanium content of the procatalysts obtained varied between 2.4 and 4.5% by weight while the donor content was varying between 9.7 and 15.4% by weight. The procatalyst yield was good, too, varying between 74 and 99%. The activity of the procatalysts was at its best 15.8 kg of PP/g of cat., which is a good value and considerably better than that of spray-dried catalysts.

The isotacticity of the polypropylene obtained with the procatalyst of the carrier according to the invention was between 96.8 and 97.5% (the index between 93.3 to 98.1) being at a satisfactory level. The polymer melt indices varied between 5.0 and 7.4 corresponding to the melt index of normal polypropylene. The bulk densities of the polymer varied between 0.40 and 0.44 g/ml being at normal level, too. The particle size distribution was normal, too, and, in particular, that of finely-divided material (d<1 mm) was enormously low i.e. below 10% by weight. It can thus be noticed that better results are obtained by the method according to the invention than by the conventional spray-drying or spray-crystallization.

We claim:

1. A method of preparing a particulate carrier for an olefin polymerization procatalyst comprising a transition metal compound, the method comprising:

a) providing a melt MgCl$_2$—$C_2H_5OH$ complex containing on average 3.3 to 5.5 $C_2H_5OH$ molecules per MgCl$_2$ molecule, b) spraying the melt MgCl$_2$—$C_2H_5OH$ complex through a nozzle and dispersing it into a chamber having an upper and lower portion, wherein a particulate carrier is formed from the complex, and c) removing the particulate carrier from the chamber, provided that during the spraying of the melt in step b) the removal rate of $C_2H_5OH$ from the $MgCl_2$—$C_2H_5OH$ complex is controlled—with the aid of heat—so that the particulate carrier obtained contains on average 2.0 to 3.2 $C_2H_5OH$ molecules per each $MgCl_2$ molecule.

2. The method according to claim 1, wherein in step a) there is provided a melt containing on average 3.5 to 4.0 $C_2H_5OH$ molecules per each $MgCl_2$ molecule.

3. The method according to claim 1, wherein during step b) the removal rate of $C_2H_5OH$ from the $MgCl_2$—$C_2H_5OH$ complex is controlled so that the particulate carrier obtained contains on average 2.5 to 3.0 $C_2H_5OH$ molecules per each $MgCl_2$ molecule.

4. The method according to claim 1, wherein during step b) the melt $MgCl_2$—$C_2H_5OH$ complex is sprayed in the upper portion of the chamber, where the melt complex is maintained at a temperature at which $C_2H_5OH$ is removed, and then the melt complex is conducted to the lower portion of the chamber, where the melt complex is cooled to a temperature at which the melt complex coagulates into the particulate carrier.

5. The method according to claim 4, wherein the melt $MgCl_2$—$C_2H_5OH$ complex is maintained at a temperature, at which $C_2H_5OH$ is removed by spraying the melt complex into the upper portion of the chamber while the melt complex is heated to a temperature essentially over the melt complex's melting point or by maintaining the upper portion of the chamber at a higher temperature than that at which the lower portion of the chamber is maintained.

6. The method according to claim 5, wherein the melt $MgCl_2$—$C_2H_5OH$ complex is sprayed in the upper portion of the chamber while the melt complex is heated to a temperature of about +120° to +250° C.

7. The method according to claim 5, wherein the upper portion of the chamber is maintained at a temperature of +20° to +150° C., and the lower portion of the chamber is maintained at a temperature of −30° to +40° C., in a way such that the temperature of the lower portion of the chamber is lower than that of the upper portion of the chamber.

8. The method according to claim 7, wherein the melt $MgCl_2$—$C_2H_5OH$ complex is sprayed in the upper portion of the chamber while the melt complex is heated to a temperature which is over its melting point, higher than about +130° C. and up to the temperature of the upper portion of the chamber.

9. The method according to claim 1, wherein the melt $MgCl_2$—$C_2H_5OH$ complex is sprayed into the chamber with an aid of a hot nitrogen flow.

10. The method according to claim 1, wherein the temperatures of the upper and lower portions of the chamber are maintained with an aid of one or more nitrogen gas flows.

11. The method according to claim 1, wherein the nozzle dispersing the melt $MgCl_2$—$C_2H_5OH$ complex is a gas-liquid-fluidizing nozzle, a rotatable nozzle or an ultrasound nozzle.

12. The method according to claim 1, wherein the particulate carrier obtained is reacted with $TiCl_4$ and optionally with an electron donor to provide an olefin polymerization procatalyst.

13. The method according to claim 11, wherein the particulate carrier obtained is reacted with $TiCl_4$ and optionally with an electron donor to provide an olefin polymerization procatalyst.

14. The method according to claim 2, wherein the melt contains about 3.7 $C_2H_5OH$ molecules per each $MgCl_2$ molecule.

15. The method according to claim 7, wherein the upper portion of the chamber is maintained at a temperature of +30° to +80° C. and the lower portion of the chamber is maintained at a temperature of −20° to +40° C., in a way such that the temperature of the lower portion of the chamber is lower than that of the upper portion of the chamber.

16. The method according to claim 8, wherein the temperature of the upper portion of the chamber is above 130° C. and up to a temperature of 250° C.

* * * * *